Figure 10:
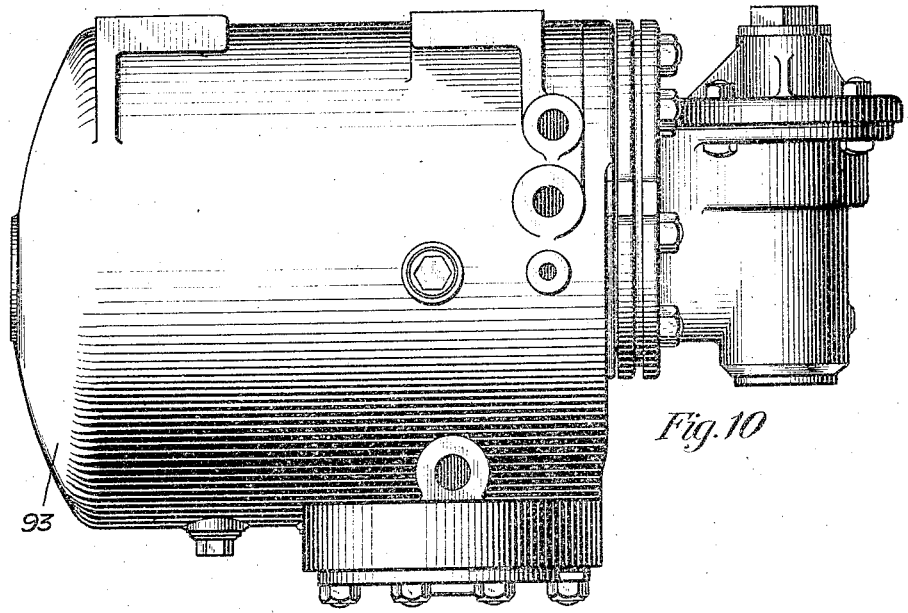

W. V. TURNER.
CONTROL VALVE DEVICE FOR FLUID PRESSURE BRAKES.
APPLICATION FILED MAR. 14, 1910.
1,141,159.
Patented June 1, 1915.
8 SHEETS—SHEET 1.
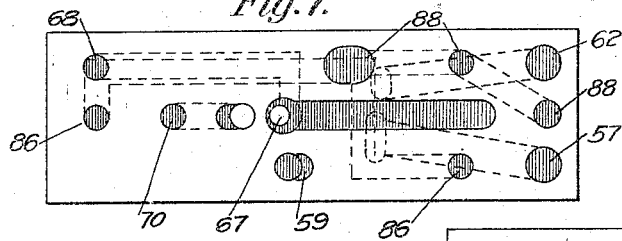
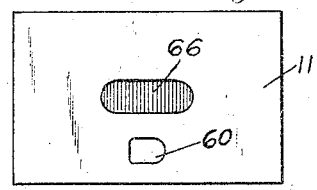
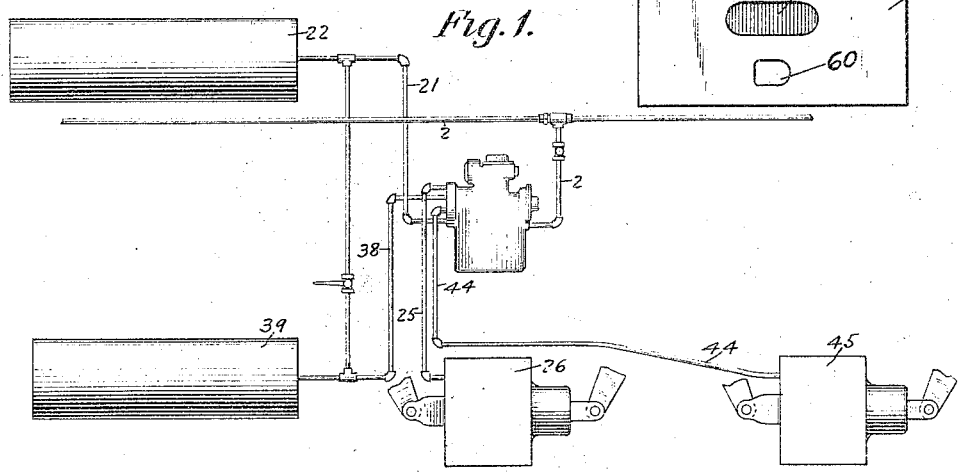
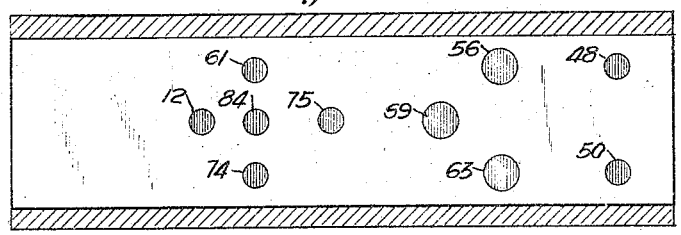
WITNESSES
INVENTOR
Walter V. Turner
by
Att'y.

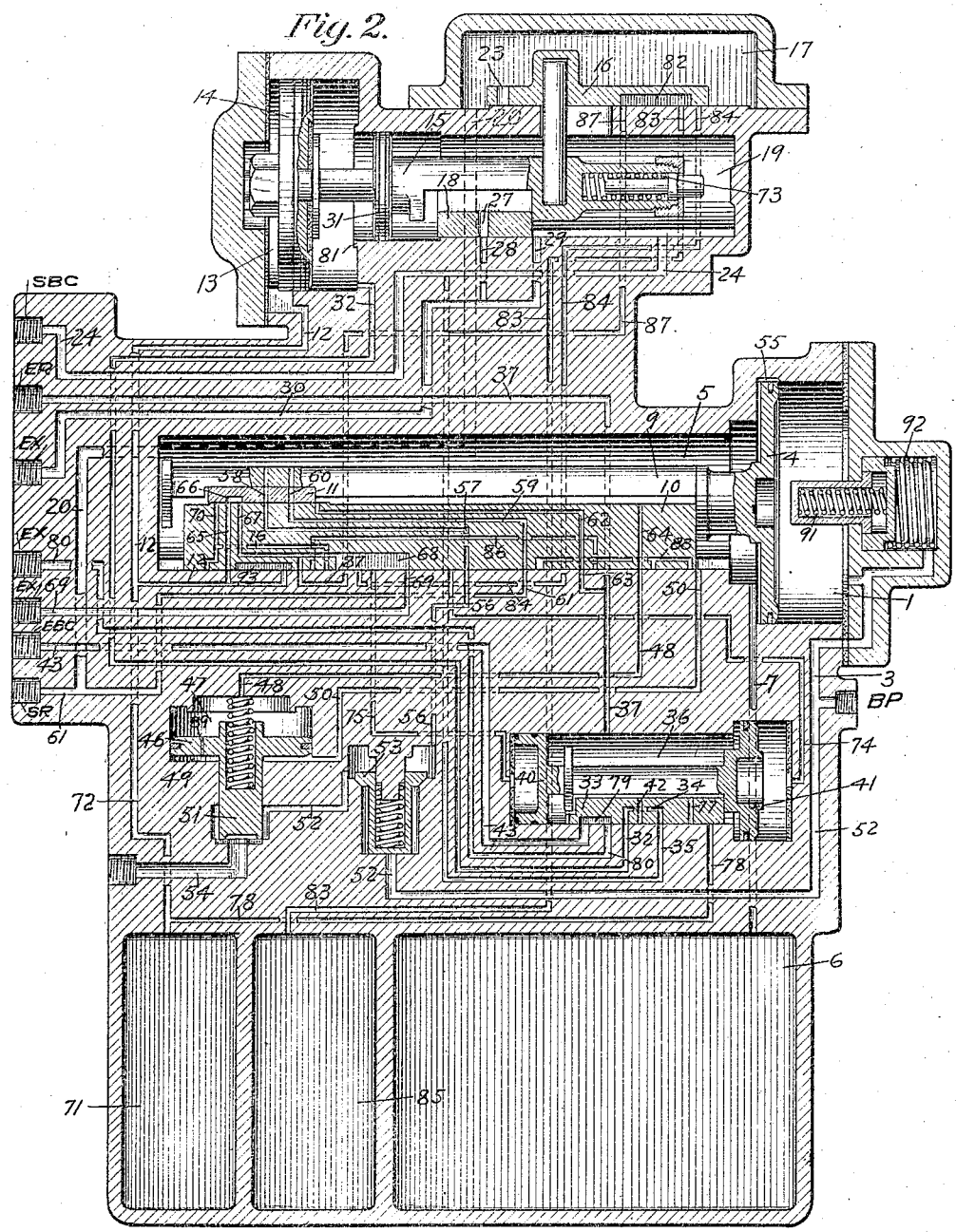

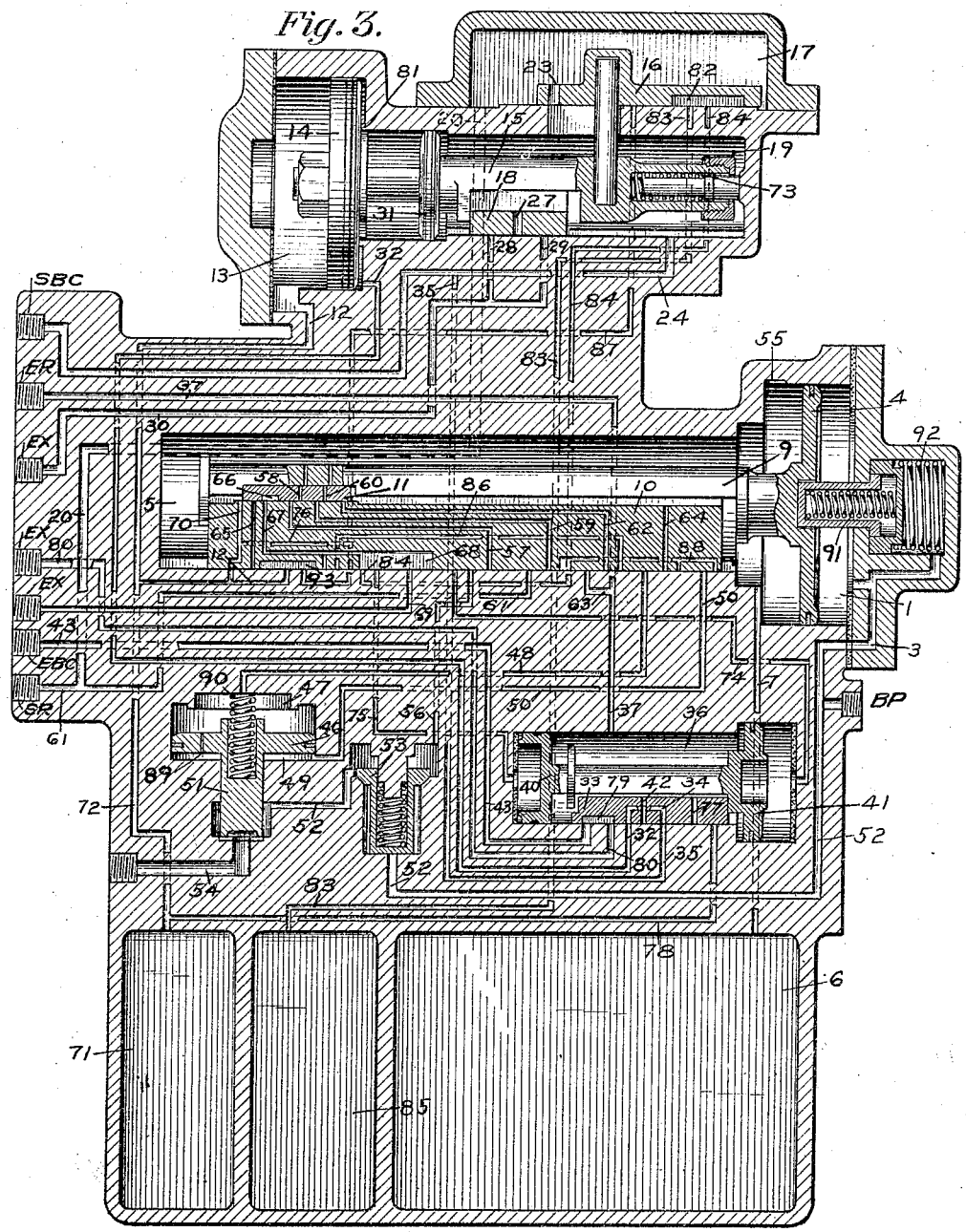

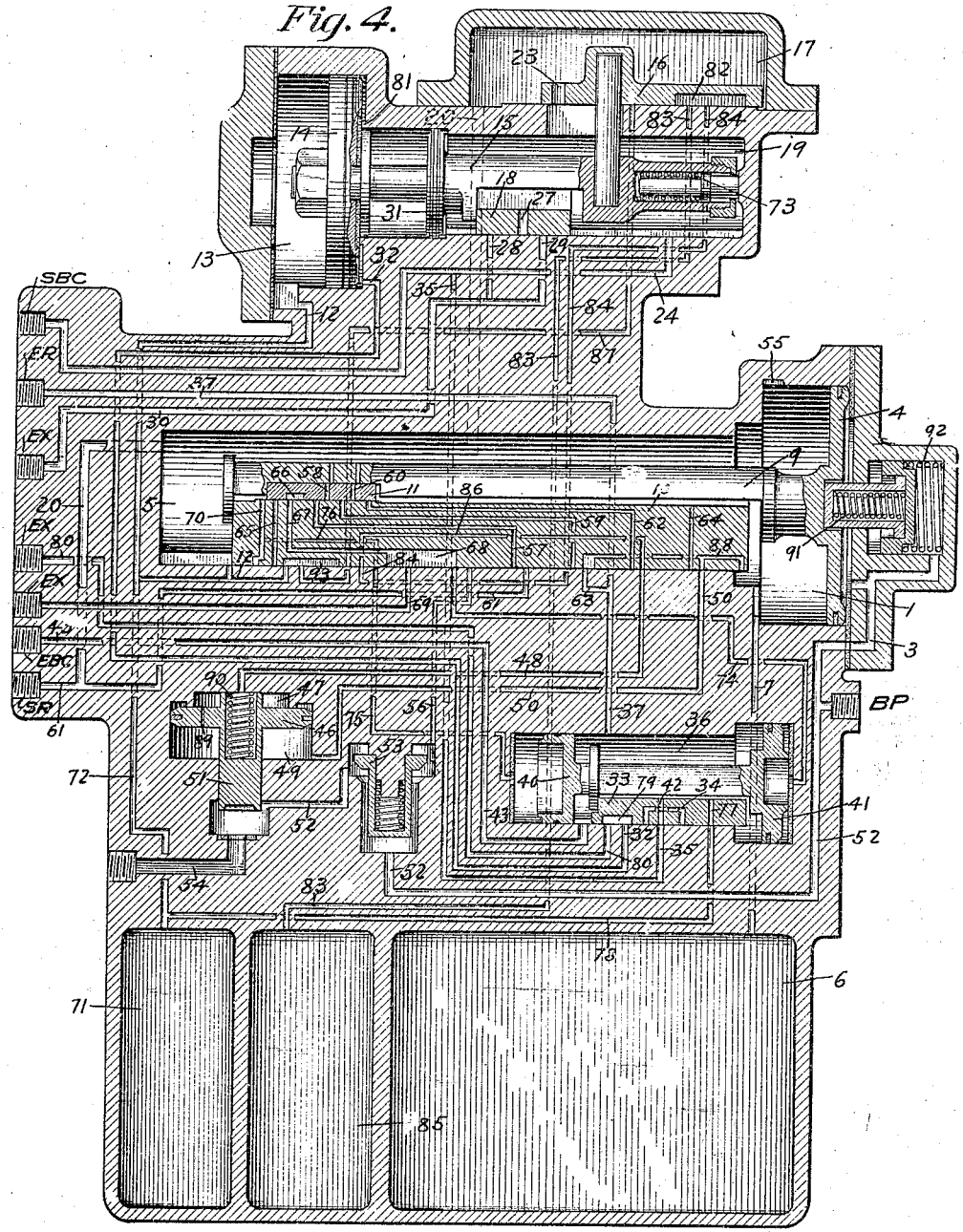

W. V. TURNER.
CONTROL VALVE DEVICE FOR FLUID PRESSURE BRAKES.
APPLICATION FILED MAR. 14, 1910.
1,141,159.
Patented June 1, 1915.
8 SHEETS—SHEET 5.
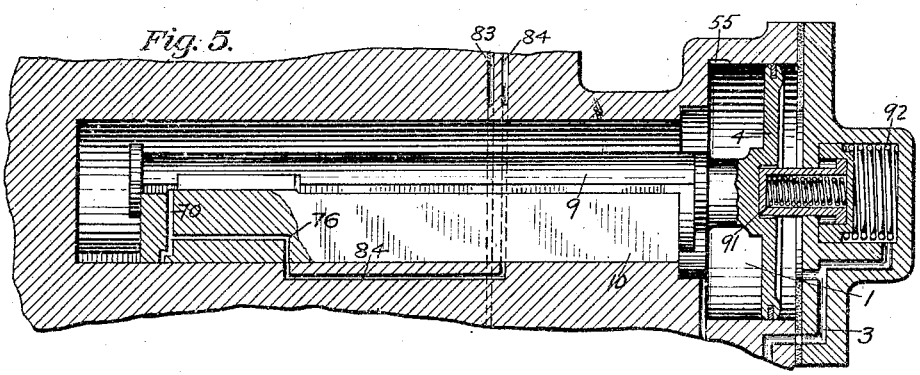
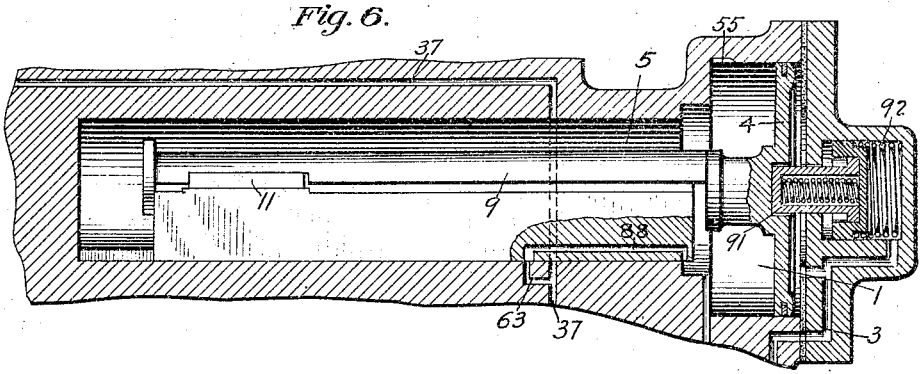
WITNESSES
INVENTOR
Walter V. Turner
by　　　Att'y.

W. V. TURNER.
CONTROL VALVE DEVICE FOR FLUID PRESSURE BRAKES.
APPLICATION FILED MAR. 14, 1910.

1,141,159. Patented June 1, 1915.
8 SHEETS—SHEET 6.

WITNESSES
Wm. M. Cady
R. C. Swartzwelder

INVENTOR
Walter V. Turner
by E. Wright
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

CONTROL-VALVE DEVICE FOR FLUID-PRESSURE BRAKES.

1,141,159.  Specification of Letters Patent.  Patented June 1, 1915.

Application filed March 14, 1910. Serial No. 549,229.

*To all whom it may concern:*

Be it known that I, WALTER V. TURNER, a citizen of the United States, residing at Edgewood, in the county of Allegheny and State of Pennsylvania, have invented new and useful Improvements in Control-Valve Devices for Fluid-Pressure Brakes, of which the following is a specification.

This invention relates to fluid pressure brakes, and more particularly to a brake equipment adapted for controlling the brakes on heavy high-speed trains, such as those operated in passenger train service.

In this class of service, it is particularly important to provide a brake equipment capable of stopping the train in the shortest possible time, in case of an emergency, while having the so-called quality of flexibility for service, whereby fine graduations in brake cylinder pressure may be obtained, so that smooth accurate stops may be made.

A brake equipment well adapted for the above purposes is shown in prior Patent No. 702,268 of H. H. Westinghouse, granted June 10, 1902, in which two brake cylinders are provided, one being employed in service in connection with an auxiliary reservoir of the usual relative volume, so as to secure the desired flexibility of the standard automatic brake for service braking, while means are provided for supplying air in an emergency application to both brake cylinders in order to obtain the desired heavy braking force for quickly stopping the train in an emergency.

An apparatus of the above character has the advantage that a heavy braking force may be secured without the necessity for employing a higher equalizing pressure in emergency than that employed in service, so that safety or limiting valve devices for limiting the brake cylinder pressure in service applications may be dispensed with, though if desired, a higher emergency equalizing pressure may be employed in connection with the two brake cylinders, in which case a much higher braking force may be obtained.

One object of my invention is to provide an improved brake equipment of the above nature, employing one brake cylinder area for service and a larger brake cylinder area for emergency applications.

Another object of my invention contemplates providing a control valve device adapted to control the pressure in two or more brake cylinders and comprising a valve mechanism operating in response to variations in pressure in an application chamber for controlling the supply of fluid to one brake cylinder area in service, an automatic valve device subject to train pipe pressure for controlling the pressure in the application chamber, and adapted upon a sudden reduction in train pipe pressure to supply fluid to a larger brake cylinder area.

Another object of my improvements is to provide improved means for effecting a graduated release of the brakes in connection with a control valve device of the type having a brake cylinder application and release valve mechanism operating in response to variations in pressure in an application chamber and an automatic valve device subject to train pipe pressure for controlling the pressure in the application chamber.

Another object of my invention is to provide a control valve device of the above described type having means adapted on an initial application of the brakes to supply air both to the application chamber and an additional chamber, in order to compensate for fluid supplied to the brake cylinder to displace the brake cylinder piston on cars equipped with the usual standard brake apparatus, so that substantially uniform brake cylinder pressures may be obtained on all the cars of a train, for a given reduction in train pipe pressure.

Another object of my invention is to provide an automatic valve device operating in response to a gradual reduction in train pipe pressure for effecting a service application of the brakes and in response to a sudden reduction in train pipe pressure for effecting an emergency application of the brakes, and means tending to prevent movement of the automatic valve device to emergency position under gradual reductions in train pipe pressure and for insuring the movement to emergency position upon a sudden reduction in train pipe pressure or under certain other conditions.

Still another object if my improvements is to provide a control valve device of a generally improved and compact design.

Figure 11:
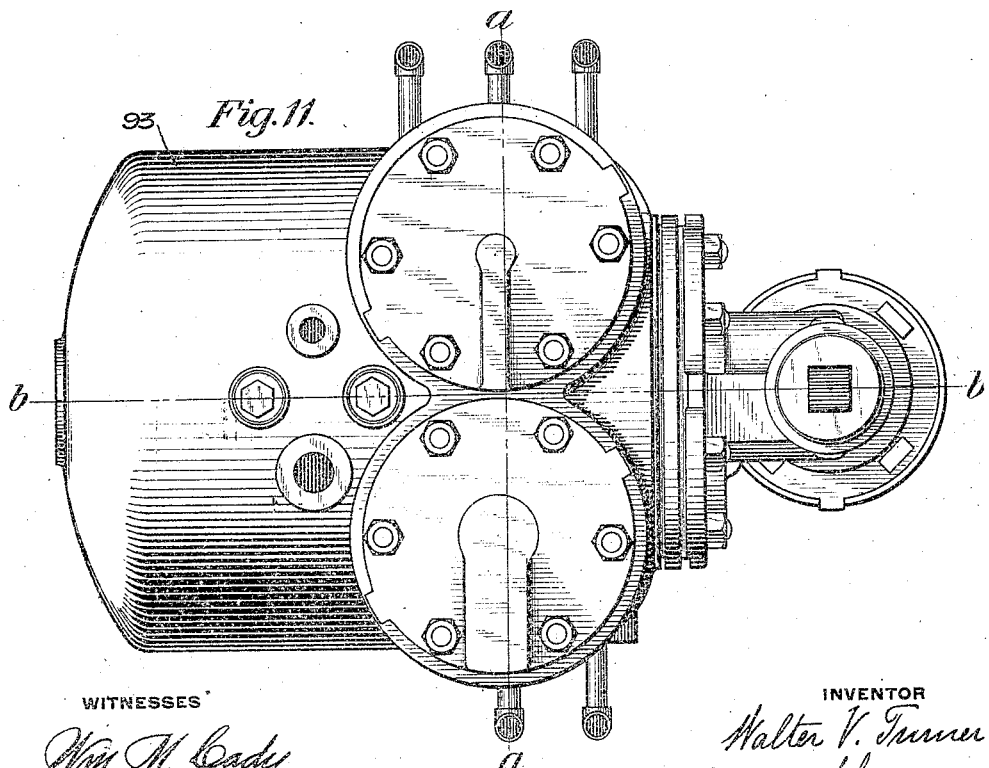
Figure 12:
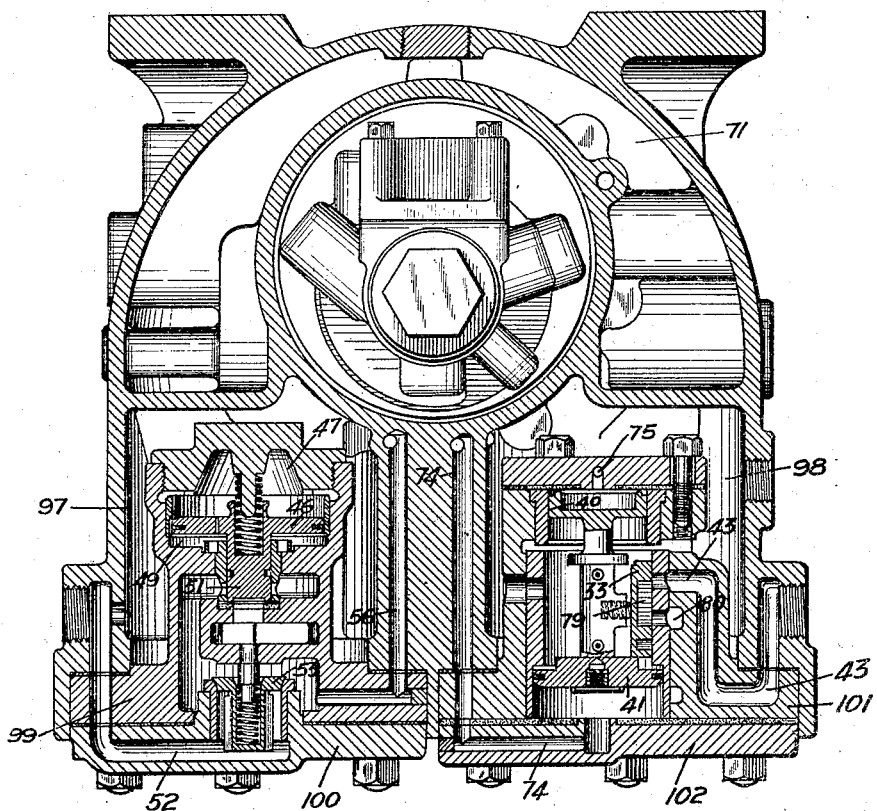

In the accompanying drawings; Figure 1 is a diagrammatic view of a car brake equipment showing my improvements applied thereto; Fig. 2 a diagrammatic central sectional view of the control valve device constructed according to my invention, showing the parts in the normal release position; Fig. 3 a similar view, showing the parts in service application position; Fig. 4 a similar view, showing the parts in emergency application position; Fig. 5 a similar view of the automatic valve portion of the control valve device, showing the parts in a position intermediate service and emergency application positions; Fig. 6 a similar view, showing the parts in still another position intermediate service and emergency application positions; Fig. 7 a face view of the main slide valve of the automatic valve device, showing the relative locations of the ports in the actual valve; Fig. 8 a face view of the graduating valve which is mounted in the main slide valve; Fig. 9 a plan view of the seat for the above main slide valve; Fig. 10 a side elevation of the control valve device illustrating the preferred actual construction; Fig. 11 an inverted plan view thereof; Fig. 12 a section of the control valve device substantially on the line $a$—$a$ of Fig. 11; and Fig. 13 a section on the line $b$—$b$ of Fig. 11.

According to the preferred construction, as shown in Figs. 2 to 6 inclusive, the control valve mechanism may comprise an automatic valve device portion having a piston chamber 1 communicating with the train pipe 2 through a passage 3 and containing piston 4, and a valve chamber 5 communicating with a pressure chamber or reservoir 6 through a passage 7.

The piston 4 is provided with a stem 9 for operating a main valve 10 and an auxiliary valve 11, mounted on the main valve and having a movement relative thereto. The main slide valve 10 controls a passage 12 through which air is supplied to and released from an application chamber 71 connected by passages 72 and 12 to piston chamber 13, containing a movable abutment 14 of the brake cylinder supply and release valve mechanism. Said abutment 14 is provided with a stem 15 for actuating a supply valve 16 contained in valve chamber 17 and an exhaust valve 18 contained in valve chamber 19.

The valve chamber 17 communicates through a passage 20 with a pipe 21 leading to the service reservoir 22 and the supply valve 16 is provided with a through port 23 for controlling the supply of air from the valve chamber 17 and service reservoir to the valve chamber 19, which is in open communication with a passage 24 connected to the pipe 25 leading to the service brake cylinder 26.

The exhaust valve 18 is provided with a through port 27 and controls communication from the valve chamber 19 and consequently the service brake cylinder 26 to ports 28 and 29, connected to exhaust passage 30.

In order to prevent the too rapid change in pressure on the brake cylinder side of abutment 14, a piston 31 may be mounted on the piston stem 15 between abutment 14 and the valve chamber 19, the space between the pistons being normally connected to the service brake cylinder 22 through a passage 32 leading to the seat of the by-pass valve 33 and thence through a cross-over port 34 therein to a passage 35 which communicates with the service brake cylinder passage 24.

The by-pass valve 33 is contained in valve chamber 36, which is connected through a passage 37 with pipe 38 leading to the emergency reservoir 39 and said valve is operated by a differential piston having piston heads 40 and 41. The by-pass valve is provided with a through port 42 for supplying air from the emergency reservoir 39 to passage 35 and the service brake cylinder in an emergency application of the brakes and is also adapted to control a passage 43 communicating with pipe 44 leading to the emergency brake cylinder 45.

An emergency valve mechanism is also provided comprising a movable abutment 46, the chamber 47 on one side of which is open to a passage 48, leading to the seat of the main slide valve 10, the chamber 49 on the opposite side communicating with a passage 50, also leading to the seat of the main slide valve. The abutment 46 is adapted to operate a train pipe vent valve 51 for controlling communication from a train pipe passage 52, having interposed therein the usual emergency check valve 53, to a passage 54 leading preferably to the atmosphere.

The parts are charged in the release position of the automatic valve device in the usual manner by flow of air from the train pipe through the feed groove 55 around the piston 4 to valve chamber 5 and also through a quick recharge passage 56 leading from the valve chamber of the emergency check valve 53 and registering with through ports 57 and 58 in the main valve 10 and the auxiliary valve 11 respectively.

From valve chamber 5 air flows through passage 7 to charge the pressure chamber 6, through a port 59 in the main valve 10 and port 60 in the auxiliary valve 11 to a passage 61 leading to the service reservoir 22, through a port 62 in the main slide valve to passage 63, connected to passage 37 leading to the emergency reservoir 39 and the by-pass valve chamber 36, through port 64 in said main valve to passage 48 and chamber 47 of the emergency piston 46, and through passage 50 to the chamber 49 of said emergency piston.

The parts being charged up to the normal train pipe pressure with the automatic valve device in release position, the application chamber 71 and piston chamber 13 are open to the atmosphere through passage 12, port 65 in the main slide valve 10, cavity 66 in the auxiliary valve 11, and port 67 and cavity 68 in the main valve to exhaust passage 69, as shown in Fig. 2. The brake cylinder supply and release valve mechanism is therefore in its outer position in which port 27 registers with passage 28 so that passages 28 and 29 are open to the valve chamber 19, thereby connecting the service brake cylinder with the atmosphere.

If it is desired to make a service application of the brakes, a gradual reduction in train pipe pressure is effected in the usual manner, whereupon the piston 4 of the automatic valve device moves out to service application position, as shown in Fig. 3, in which position a through port 70 in the main slide valve is uncovered by the movement of the auxiliary valve 11 and registers with passage 12. Fluid under pressure is thereupon supplied from the valve chamber 5 and the pressure chamber 6 to the application chamber 71, which is made of such capacity relative to the pressure chamber that the desired pressure will be produced in the application chamber for a given reduction in train pipe pressure. The piston 14 is then actuated by the fluid pressure supplied to piston chamber 13 to close the exhaust ports from the valve chamber 19 and the supply valve 16 is operated to admit fluid from the valve chamber 17 and the service reservoir to valve chamber 19, whence the air flows to the service brake cylinder 26 through passage 24 and pipe 25. As the brake cylinder pressure rises by the flow of air from the service reservoir, the pressure is communicated to piston 14 through passage 35, cross-over port 34, in the by-pass valve, and passage 32, and when the brake cylinder pressure substantially equals the pressure in the application chamber 71, the piston 14 is shifted to close the supply port 23, a spring 73 being preferably provided to assist the closing movement of the supply valve 16. It will thus be seen that the pressure charged into the brake cylinder corresponds with the pressure in the application chamber and that in case of leakage from the brake cylinder, the pressure will be automatically maintained by the movement of the piston 14 in the direction of the lower brake cylinder pressure, to again admit fluid to the brake cylinder. The pressure in the pressure chamber 6 having equalized with the train pipe pressure by flow to the application chamber, the piston 4 is moved inwardly so that the auxiliary valve 11 is caused to close the port 70 and prevent the further flow of air to the application chamber. By making further reductions in train pipe pressure as desired, so as to increase the pressure in the application chamber, the brake cylinder pressure may be correspondingly increased, as will be apparent.

In order to effect an emergency application of the brakes the train pipe pressure is suddenly reduced so as to cause the piston 4 to move out its extreme traverse, assuming the position shown in Fig. 4. The main slide valve 10 now uncovers passage 12 to admit fluid from the pressure chamber to the application chamber, and the chamber at the outer face of piston head 41 is connected through a passage 74 and cavity 68 in the main slide valve 10, with exhaust passage 69, while a passage 75 leading from the outer face of the smaller piston head 40 is connected to a port 76 in the main slide valve, opening into port 70. The pressure of the emergency reservoir in the valve chamber 36 acting between the piston heads on the differential area of the larger piston head 41 together with the pressure of the pressure chamber on the smaller piston head 40, operates to shift the by-pass valve mechanism to its extreme outer position in which a port 77 in the slide valve 33 registers with passage 78 connected to passage 72, so that fluid from the emergency reservoir also flows to the application chamber. A cavity 79 in the by-pass valve connects passage 32 with an exhaust passage 80 to the atmosphere, so that the inner face of piston 14 is vented to the atmosphere, a rib 81 being preferably provided on which the piston 14 is adapted to seat so as to prevent possible leakage from the valve chamber 19 and the brake cylinder. The piston 14 is thus maintained in application position regardless of the brake cylinder pressure or the pressure in the application chamber acting on the piston 14 and fluid is supplied from the service reservoir through the supply port 23 to the service brake cylinder 26 until the pressures fully equalize. By movement of the piston 14 to application position, a cavity 82 in the supply valve 16 is caused to connect passages 83 and 84, the passage 83 leading to a reduction reservoir 85 and the passage 84 being connected by a cross-over port 86 in the main slide valve 10 with a passage 48, leading to the chamber 47 above emergency vent valve piston 46. As this reduction reservoir 85 is connected to the atmosphere in release position of the parts, from passage 83, through cavity 82 in valve 16, passage 87, port 67 in the main slide valve, and cavity 68, to exhaust passage 69, it will be seen that said reservoir is normally at atmospheric pressure, and so in emergency position of the parts, fluid is vented from chamber 47 to the reduction reservoir 85. Passage 50 to the chamber 49 on the opposite side of the emergency piston 46 registers with a port opening of a cross-over port 88 in the main slide valve, another port opening of which registers with passage 63. Fluid at emergency reservoir pressure is thus supplied from the valve chamber 36 to the chamber 49, and the abutment 46 is thus shifted to its outer position, lifting the vent valve 51 from its seat and thereby venting fluid from the train pipe to cause a local reduction in train pipe pressure and the well known quick serial action of the automatic valve devices throughout the train. Passage 43 is also uncovered by the by-pass valve 33, so that fluid from the valve chamber 36 and the emergency reservoir is supplied to the emergency brake cylinder 45.

A small equalizing port 89 may be provided in the piston 46, so that after a predetermined period of time, the fluid pressure in chamber 49 equalizes into the reduction reservoir 85 and the fluid pressures on the piston being equal, the spring 90 is adapted to return the piston 46 and close the vent valve 51.

It will now be seen that in an emergency application of the brakes, the additional emergency brake cylinder 45 is cut in and also the additional emergency reservoir 39, so that a much greater braking force is secured in an emergency application than in a service application where only one brake cylinder is employed.

The brakes may be released in the usual manner by increasing the train pipe pressure, so as to shift the automatic piston 4 to release position, in which the application chamber 71 is vented to the atmosphere, causing the piston 14 to return to release position and open the exhaust to the service brake cylinder. The piston head 40 is vented to the atmosphere through passage 75 and fluid pressure equalizing around piston head 41 from the valve chamber 36, the port 74 being closed, the by-pass valve device is shifted to normal release position, connecting the emergency brake cylinder passage 43, through cavity 79 with exhaust passage 80, and connecting the inner face of piston 14, through cross-over port 34 with the service brake cylinder 26.

With the usual standard triple valve device, in making service applications, the train pipe pressure may sometimes be reduced by slow leakage from the train pipe or by a gradual reduction after the auxiliary reservoir has fully equalized into the brake cylinder, and when this happens the triple valve piston is shifted to emergency position by the higher xiliary reservoir pressure, which pressure is no longer reduced by flow to the brake cylinder, thereby causing an undesired emergency application of the brakes. According to the present construction, means are provided for preventing movement of the automatic valve device to emergency position upon gradual reductions in train pipe pressure and for this purpose when the piston 4 and valve 10 are moved slightly beyond service application position, as the position shown in Fig. 5, a port 76, opening into the port 70, is adapted to register with passage 84, so that communication is open from valve chamber 5 through ports 70 and 76, passage 84, cavity 82 in valve 16, and passage 83 to the reduction reservoir 85. As previously described, this reduction reservoir is normally at atmospheric pressure, so that upon movement to the above position, fluid is vented from the valve chamber 5 and the pressure chamber until the pressure is reduced to a degree slightly less than the reduced train pipe pressure, when the parts are moved back to service position. In order to assist the movement of the parts, in addition to the usual graduating spring 91, a spring 92 is provided, which is adapted to act on the piston 4 so as to resist its movement beyond service position and the spring also tends to return the piston to service position.

Upon further reductions in train pipe pressure below the equalizing point, the automatic valve parts are again moved out to the position shown in Fig. 5, and more fluid is vented from the pressure chamber. If the reduction reservoir is made large or if the pressure chamber is vented directly to the atmosphere, it will be seen that an emergency application could be prevented indefinitely under gradual reductions in train pipe pressure but I prefer to make the reduction reservoir of limited capacity, so that when a certain low pressure is reached in the train pipe the pressure in the reduction reservoir will fully equalize with the pressure chamber and thus cause any further reduction in train pipe pressure to shift the parts to emergency position and thereby effect an emergency application of the brakes.

While it is highly desirable to prevent an emergency application when only gradual reductions in train pipe pressure are made, it is also very desirable to be able to obtain an emergency application upon a sudden reduction in train pipe pressure at any time under all conditions. This is provided for primarily by utilizing the high reserve pressure of the emergency reservoir for operating the emergency piston 46 and the by-pass valve device, but the automatic valve device may fail to go to emergency position through leakage, especially where the pressure in the pressure chamber has been reduced to a low degree by venting to the reduction reservoir.

In order to insure the movement of the parts to emergency position I therefore provide means for supplying fluid to the pressure chamber side of the piston 4 in a po tion between that shown in Fig. 5 and emergency position.

Accordingly, as shown in Fig. 6, as the piston 4 moves beyond the position shown in Fig. 5, the port 88 registers with port 63 at one end and opens to the valve chamber 5 at the other end. Fluid from the emergency reservoir is then supplied through the passage 37, passage 63, and port 88 to the valve chamber 5 and, acting on piston 4, quickly shifts same to emergency position.

The brakes being applied may be partially released by making a gradual increase in train pipe pressure, thereby causing the automatic piston 4 to be shifted to release position. Fluid is then vented from the application chamber 71 of the brake cylinder supply and release valve mechanism, causing the piston 14 to open the exhaust to the service brake cylinder.

In the release position of the automatic valve device, the emergency reservoir passage 37 is connected to the valve chamber 5 through passage 63 and port 62, and consequently, as the pressure in the emergency reservoir is held in-tact during service applications of the brakes, air flows to the valve chamber 5 and, raising the pressure therein, shifts the piston 4 outwardly, causing the auxiliary valve 11 to cut off the further release of fluid from the application chamber.

It will thus be seen that a partial reduction in pressure in the application chamber is effected and thereby the brake cylinder supply and release valve mechanism is operated to cause a corresponding reduction in the brake cylinder pressure. It will be evident that this operation may be repeated by further gradually increasing the train pipe pressure, to grade down the brake cylinder pressure as may be desired.

The relative volumes of the pressure chamber and the application chamber are preferably made to correspond with the relative volumes of the auxiliary reservoir and the brake cylinder of the usual standard brake equipment, but as with the standard apparatus fluid is supplied from the auxiliary reservoir to push out or displace the brake cylinder piston while with the present apparatus the fluid from the pressure chamber flows to an application chamber of fixed volume, it will be seen that upon an initial application of the brakes, for a given reduction in train pipe pressure, a higher pressure will be obtained in the application chamber and consequently in the brake cylinder, than is obtained on a car equipped with the usual standard apparatus.

In case cars having both kinds of equipment are coupled in the same train and it is desired to secure more nearly uniform pressures in all the brake cylinders, I have provided means operating under initial applications of the brakes to compensate for the brake cylinder displacement above referred to. For this purpose, a cavity 93 is provided in the main slide valve 10, which in service application position connects the passage 12 with the passage 87. In the release position of the supply valve 16, cavity 82 connects said passage 87 with passage 83 which leads to the reduction reservoir 85. Thus it will be seen that before the piston 14 moves, fluid from the pressure chamber equalizes into both the application chamber and the reduction reservoir, and in this way compensates for the displacement of the brake cylinder piston in the standard apparatus by the additional flow to the reduction reservoir 85. As soon as the piston 14 moves from release position the connection between the application chamber and the reduction reservoir is cut off and thereafter the fluid from the pressure chamber equalizes only into the application chamber. In order to have the reduction reservoir at atmospheric pressure for the other purposes for which it is employed the cavity 82 in the valve 16 is adapted to connect the reduction reservoir passage 83 with passage 84, which communicates with cavity 68 in the main slide valve in service application position, and the exhaust passage 69 being also open to this cavity, it will be seen that the reduction reservoir is again reduced to atmospheric pressure.

Figure 13:
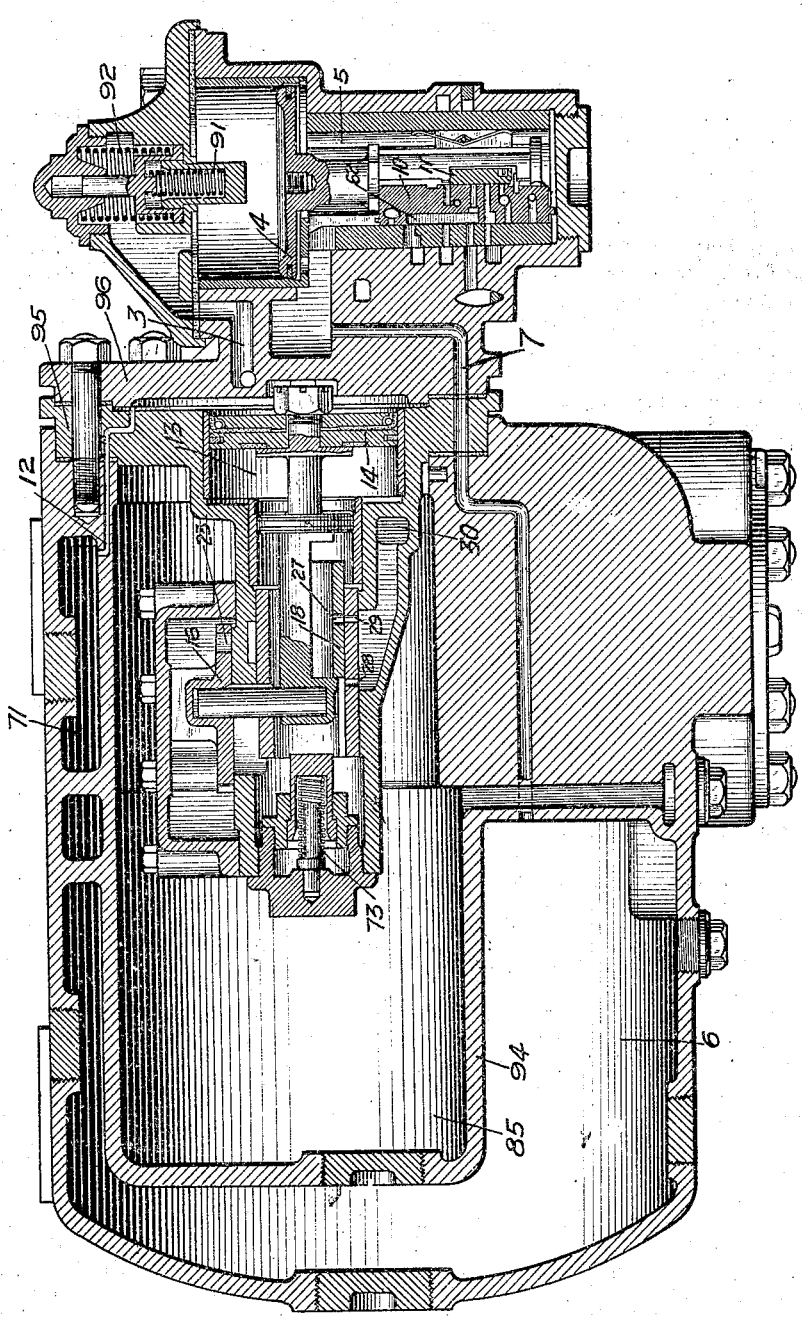

In Figs. 10 to 13 inclusive, a preferred structural design for the control valve device is shown, in which a casing 93 is provided. The space within the casing at the rear forms the pressure chamber 6 connected by passage 7 to the automatic valve chamber 5. Extending inwardly from the front face of the casing 93 is a cylindrical section 94, the space within which forms the reduction reservoir 85. The brake cylinder application and release valve mechanism is constructed as a unit and is adapted to be inserted within the reduction reservoir 85, being provided with a suitable head portion 95 which is adapted to be secured to the front face of the casing 93, as shown in Fig. 13.

The automatic valve device is also constructed in the form of a unit, and is provided with a head 96 adapted to be secured to the outer face of the head 95.

Extending upwardly from the under face of the casing 93 are two chambers 97 and 98, as shown in Fig. 12, and in the chamber 97, the emergency vent valve mechanism is adapted to be inserted, said valve mechanism having a flange portion 99 for engaging the casing and a clamping head 100 for securing the valve mechanism in position. In a similar manner, the by-pass valve device is provided with a flange portion 101 and is adapted to be inserted into the chamber 98, a head 102 being provided for securing the valve device in position. The chamber 98 is connected to the emergency reservoir 39 and is in open communication with the space between the heads 40 and 41 of the by-pass valve device.

The saddle shaped space formed at the forward portion of the casing 93, as shown in Fig. 12, constitutes the application chamber, which is connected to the piston chamber 13 at the outer face of the piston 14 by passage 12.

It will now be seen that a very compact structure is provided and that as the several valve mechanisms are made as units, one valve mechanism may be readily removed for repairs when desired without disturbing the other valve mechanisms. Furthermore, the valve mechanisms, with the exception of the automatic valve device, being located within the casing 93 are protected from injury in shipping and while in use.

From the foregoing description it will be clear that by employing a valve mechanism subject to the opposing pressures of an application chamber and the brake cylinder the pressure in the brake cylinder may be maintained at a predetermined degree corresponding with the pressure in the application chamber, regardless of leakage from the brake cylinder and of variations in piston travel of the brake piston and it likewise follows that uniform brake cylinder pressure will be obtained on all cars of a train equipped with the control valve apparatus, corresponding with a given reduction in train pipe pressure. Also by employing two brake cylinders, so that one brake cylinder area is provided for service braking and a larger brake cylinder area for emergency applications of the brakes, a high braking force may be obtained in an emergency without employing safety or limiting valve devices to limit the brake cylinder pressure in service.

It will also be noted that, as the brake cylinder pressure obtained in service applications is dependent on the relative volumes of the pressure chamber and the application chamber, the reservoir or source of fluid pressure from which air is supplied to the brake cylinder may be of any size, and thus a large reservoir may be provided if desired so as to have an ample reserve supply of fluid under pressure to insure the maintenance of the brake cylinder pressure in service and a high pressure for an emergency application of the brakes.

Having now described my invention, what I claim as new and desire to secure by Letters Patent, is:—

1. In a fluid pressure brake, the combination with a train brake pipe, an application chamber, means operated according to variations in brake pipe pressure for controlling the pressure in said chamber, and valve means governed by the pressure in the application chamber for controlling the supply of fluid to a service brake cylinder area, of means operating in emergency applications to supply fluid to an emergency brake cylinder area.

2. In a fluid pressure brake, the combination with a train brake pipe, a chamber, and means governed by variations in brake pipe pressure for controlling the supply of fluid to said chamber, of a valve mechanism governed by the pressure in said chamber for controlling the supply of fluid to a service brake cylinder area, and means operating under a sudden reduction in brake pipe pressure for supplying fluid to an emergency brake cylinder area.

3. In a fluid pressure brake, the combination with a train brake pipe, of an application chamber, a valve mechanism operated by the pressure in said chamber for supplying fluid to one brake cylinder area, an automatic valve device subject to variations in train pipe pressure for controlling the pressure in the application chamber, and means controlled by said automatic valve device for supplying fluid to a larger brake cylinder area upon a sudden reduction in train pipe pressure.

4. In a fluid pressure brake, the combination with a train brake pipe, a service brake cylinder, an emergency brake cylinder, a chamber, and means governed by the pressure in said chamber for controlling the supply of fluid to the service brake cylinder, of valve mechanism operated by variations in train pipe pressure for controlling the supply of fluid to said chamber, and means operating in emergency applications for supplying fluid to both brake cylinders.

5. In a fluid pressure brake, the combination with a train pipe and a service brake cylinder, of an application chamber, a valve mechanism operated by varying the pressure in said chamber for supplying fluid to the service brake cylinder, an emergency brake cylinder, an automatic valve device operating upon a gradual reduction in train pipe pressure for varying the pressure in the application chamber and means operated by the automatic valve device upon a sudden reduction in train pipe pressure for supplying fluid to the emergency brake cylinder.

6. In a fluid pressure brake, the combination with a train brake pipe, a service brake cylinder, an emergency brake cylinder, a chamber, and means governed by the pressure in said chamber for controlling the supply of fluid to the service brake cylinder, of a valve mechanism operated by variations in train pipe pressure for controlling the supply of fluid to said chamber, and means operating in emergency applications for supplying fluid from an additional source to the emergency brake cylinder.

7. In a fluid pressure brake, the combination with a train pipe, of a valve mechanism comprising a valve for supplying air to the brake cylinder, a movable abutment subject to the opposing pressures of the brake cylinder and a chamber for operating said valve, an automatic valve device subject to variations in train pipe pressure for controlling the pressure in said chamber, and means controlled by the automatic valve device and operating upon a sudden reduction in train pipe pressure for suppying air to an additional brake cylinder.

8. In a fluid pressure brake, the combination with a train brake pipe, an application chamber, and a valve mechanism governed by the application chamber pressure for controlling the supply of fluid from one source of pressure to a brake cylinder, of an automatic valve device operated by variations in train pipe pressure for controlling the supply of fluid to said application chamber, and means operating in emergency applications to supply fluid from another source of fluid under pressure to effect a more powerful application of brakes.

9. In a fluid pressure brake, the combination with a train brake pipe, an application chamber, and valve mechanism governed by the application chamber pressure for controlling the supply of fluid from one source of pressure to a brake cylinder, of an automatic valve device operated by variations in train pipe pressure for controlling the supply of fluid to said application chamber, and means operating under a sudden reduction in train pipe pressure to supply fluid from another source to increase the braking effect in emergency applications.

10. In a fluid pressure brake, the combination with a train brake pipe, an application chamber, and valve mechanism governed by the application chamber pressure for controlling the supply of fluid to a brake cylinder, of an automatic valve device operated by variations in train pipe pressure for controlling the supply of fluid to said application chamber, and valve means controlled by said automatic valve device and operating under a sudden reduction in train pipe pressure for supplying fluid from an additional source to increase the braking effect in emergency applications.

11. In a fluid pressure brake, the combination with a train brake pipe, an application chamber, and valve mechanism governed by the application chamber pressure for controlling the supply of fluid to a brake cylinder, of an automatic valve device operated by variations in train pipe pressure for controlling the supply of fluid to said application chamber, a valve for supplying fluid to increase the braking effect in emergency applications, a movable abutment for operating said valve, and means controlled by said automatic valve device for venting air from said abutment to operate the same upon a sudden reduction in train pipe pressure.

12. In a fluid pressure brake, the combination with a train pipe, of an application valve mechanism comprising a piston subject to the opposing pressures of the brake cylinder and an application chamber and valves actuated by said piston for controlling the admission and release of air from the brake cylinder and a valve device operated by a gradual increase in train pipe pressure for operating said application valve mechanism to effect a graduated release of the brakes.

13. In a fluid pressure brake, the combination with a train pipe, of an automatic valve device operating in response to a gradual reduction in train pipe pressure for supplying fluid to a service brake cylinder area, and a valve mechanism comprising a valve for controlling the supply of fluid to an emergency brake cylinder area and a differential piston for operating said valve upon a sudden reduction in train pipe pressure.

14. In a fluid pressure brake, the combination with a train pipe, of an automatic valve device operating in response to a gradual reduction in train pipe pressure for supplying fluid to a service brake cylinder area, and a valve mechanism comprising a valve and a differential piston operating in an emergency application for supplying fluid from an additional source of fluid pressure to an emergency brake cylinder area.

15. In a fluid pressure brake, the combination with a train pipe, of a valve mechanism subject to the opposing pressures of the brake cylinder and a chamber for controlling the supply of air to a service brake cylinder area upon a gradual reduction in train pipe pressure and a valve device operating upon a sudden reduction in train pipe pressure for supplying fluid to an emergency brake cylinder area.

16. In a fluid pressure brake, the combination with a train pipe, of a chamber, a valve mechanism operated by varying the pressure in said chamber for controlling the release of air from the brake cylinder, and an automatic valve device comprising a movable abutment, subject to train pipe pressure, a main valve and an auxiliary valve operated by said abutment upon a gradual increase in train pipe pressure for varying the pressure in said chamber to thereby effect a partial release of the brakes.

17. In a fluid pressure brake, the combination with a train pipe and brake cylinder, of a chamber, a valve mechanism operated by a reduction in pressure in said chamber for releasing air from the brake cylinder, and an automatic valve device comprising a movable abutment subject to train pipe pressure, a main valve and an auxiliary valve having a movement relative to the main valve and operated by said abutment upon a gradual increase in train pipe pressure for gradually reducing the pressure in said chamber to thereby effect a partial release of fluid from the brake cylinder.

18. In a fluid pressure brake, the combination with a train pipe, brake cylinder, and a reservoir, of a valve mechanism subject to the opposing pressures of the brake cylinder and a chamber for controlling the release of air from the brake cylinder, and an automatic valve device comprising a movable abutment subject to train pipe pressure, a main valve and an auxiliary valve mounted on and having a movement relative to the main valve and operated by said abutment upon a gradual increase in train pipe pressure for releasing air from said chamber and for supplying air from said reservoir to one side of the abutment.

19. In a fluid pressure brake, the combination with a train pipe, brake cylinder, and a source of fluid pressure, of a valve mechanism subject to the opposing pressures of the brake cylinder and a regulating chamber, a movable abutment subject to the opposing pressures of the train pipe and a pressure chamber for controlling the release of air from the brake cylinder, a main valve and an auxiliary valve having a movement relative to the main valve and operated by said abutment upon a gradual increase in train pipe pressure for controlling the release of air from said regulating chamber and the supply of air from said source of fluid pressure to the pressure chamber side of said abutment.

20. In a fluid pressure brake, the combination with a train pipe, of an automatic valve device normally subject on opposite sides to fluid pressure and operating upon a sudden reduction in train pipe pressure on one side for effecting an emergency application of the brakes and means for supplying additional air to the opposite side of said valve device to facilitate the movement to emergency position.

21. In a fluid pressure brake, the combination with a train pipe, of an automatic valve device having a piston subject on one side to train pipe pressure and operating upon a gradual reduction in train pipe pressure for effecting a service application of the brakes and upon a sudden reduction in train pipe pressure for effecting an emergency application of the brakes and means governed by the movement of said valve device to emergency position for supplying fluid under pressure to the opposite side of said piston to thereby insure the full movement of the parts to emergency position.

22. In a fluid pressure brake, the combination with a train pipe, of an automatic valve device subject to the opposing pressures of the train pipe and a chamber and operating upon a gradual reduction in train pipe pressure to effect a service application of the brakes and upon a sudden reduction to effect an emergency application and means for venting air from the chamber side of said valve device upon movement beyond service position under a gradual reduction in train pipe pressure and for supplying air to the chamber side of said valve device upon further movement under a sudden reduction in train pipe pressure.

23. In a fluid pressure brake, the combination with a train pipe, of an automatic valve device having a piston subject to the opposing pressures of the train pipe and a pressure chamber and operating upon a gradual reduction in train pipe pressure to effect a service application of the brakes and upon a sudden reduction in train pipe pressure to effect an emergency application of the brakes and means adapted to vent air from the pressure chamber in one position to prevent movement to emergency position and to supply air to said pressure chamber in another position to facilitate the movement to emergency position.

24. In a fluid pressure brake, the combination with a train pipe, of an automatic valve device having a piston subject to the opposing pressures of the train pipe and a chamber and valve means operated by said piston and having a position for effecting a service application of the brakes and a position for effecting an emergency application of the brakes and adapted to vent air to said chamber in one position to prevent movement to emergency position and to supply air to said valve chamber in another position to facilitate movement to emergency position.

25. In a fluid pressure brake, the combination with a train pipe, of a service brake cylinder, an application chamber, a valve mechanism governed by the pressure in said chamber for controlling the supply of air to the service brake cylinder, an emergency brake cylinder, a valve device for controlling the supply of air to said emergency brake cylinder, an automatic valve device subject to the opposing pressures of the train pipe and a pressure chamber and operating upon a gradual reduction in train pipe pressure to control the pressure in said application chamber and upon a sudden reduction in train pipe pressure to effect the operation of said emergency valve device.

26. In a fluid pressure brake, the combination with a train pipe, of an application chamber, a valve mechanism operated by varying the pressure in said chamber for supplying air to the brake cylinder, a pressure chamber, an automatic valve device subject to the opposing pressures of said pressure chamber and the train pipe for controlling the pressure in said application chamber, an additional chamber, normally at atmospheric pressure and means for connecting said additional chamber to the application chamber in making an application of the brakes.

27. In a fluid pressure brake, the combination with a train pipe and brake cylinder, of an application chamber, a valve mechanism operating upon an increase in pressure in said chamber, for supplying air to the brake cylinder, an additional chamber and an automatic valve device operated by a reduction in train pipe pressure for supplying air to the application chamber and said additional chamber.

28. In a fluid pressure brake, the combination with a train pipe and brake cylinder, of an application chamber, a valve mechanism operating upon an increase in pressure in said chamber for supplying air to the brake cylinder, an additional chamber, an automatic valve device operating upon a reduction in train pipe pressure for supplying air to both chambers, and means controlled by the movement of said valve mechanism for cutting off said additional chamber.

29. In a fluid pressure brake, the combination with a train pipe and brake cylinder, of an application chamber, a valve mechanism operating upon an increase in pressure in said chamber for supplying air to the brake cylinder, an additional chamber, an automatic valve device subject to the opposing pressures of the train pipe and a pressure chamber for supplying air from the pressure chamber to both the regulating chamber and said additional chamber, and means operated by the movement of said valve mechanism for closing communication from the pressure chamber to the additional chamber.

30. In a fluid pressure brake, the combination with a train pipe, of a chamber, a valve mechanism subject to the opposing pressures of the brake cylinder and said chamber for controlling the supply of air to the brake cylinder, an automatic valve device operating upon a gradual reduction in train pipe pressure for supplying fluid to said chamber and upon a sudden reduction in train pipe pressure for venting fluid from the opposite side of said valve mechanism to maintain same in the position for supplying air to the brake cylinder.

31. In a fluid pressure brake, the combination with a train pipe and brake cylinder, of a chamber, a valve mechanism comprising a valve for controlling the supply of fluid to the brake cylinder, a movable abutment subject to the opposing pressures of the brake cylinder and said chamber for operating same, means operated upon a gradual reduction in train pipe pressure for supplying fluid to said chamber and upon a sudden reduction in train pipe pressure for supplying fluid to said chamber and for venting fluid from the opposite side of the abutment.

32. In a fluid pressure brake, the combination with a valve mechanism comprising a valve for controlling the supply of air to the brake cylinder, an application chamber, and a differential piston for actuating said valve and having the larger head subject to the pressure of the application chamber and the smaller head to brake cylinder pressure, of means for connecting the space between the heads to the atmosphere upon a sudden reduction in train pipe pressure.

33. In a fluid pressure brake, a control valve device comprising a main casing provided with a plurality of faces having port connections, a plurality of valve mechanisms for controlling the brakes, each valve mechanism having a face with port connections adapted to register with the port connections of a corresponding face of the main casing, and means for securing each valve mechanism to its respective face on the casing.

34. In a fluid pressure brake, the combination with a train pipe, of a control valve mechanism comprising a brake cylinder application and release valve device constituting one unit, an equalizing valve device formed as a separate unit and operated by variations in train pipe pressure for controlling said application and release valve device, and a casing to which said units are detachably and separately applied.

35. In a fluid pressure brake, the combination with a train pipe, of a control valve mechanism comprising a brake cylinder application and release valve device constituting one unit, an equalizing valve device formed as a separate unit and operated by variations in train pipe pressure for controlling said application and release valve device, a quick action valve mechanism constituting another separate unit and operating upon a sudden reduction in train pipe pressure for venting air from the train pipe, and a casing to which said units are removably and separately secured.

36. In a fluid pressure brake, the combination with a train pipe, of a control valve mechanism comprising a brake cylinder application and release valve device, an equalizing valve device operated by variations in train pipe pressure for controlling said application and release valve device, a quick action valve mechanism operating upon a sudden reduction in train pipe pressure for venting air from the train pipe, an emergency valve mechanism operating upon a sudden reduction in train pipe pressure for effecting an application of the brakes at high pressure, and a casing to which said valve devices and said valve mechanisms are removably secured.

37. In a fluid pressure brake, a control valve device comprising a casing, a brake cylinder application and release valve mechanism, a by-pass valve mechanism for controlling fluid to apply the brakes in an emergency application, a train pipe vent valve mechanism, and chambers in said casing each adapted to contain one of said valve mechanisms.

38. In a fluid pressure brake, the combination with a train pipe and a plurality of valve mechanisms for effecting the control of the brakes comprising an automatic valve device subject to variations in train pipe pressure, a train pipe vent valve mechanism, a valve mechanism for controlling fluid to apply the brakes in an emergency application, and a brake cylinder application and release valve mechanism for controlling the brakes in service applications, of a casing to which said valve mechanisms are adapted to be separately attached.

39. In a fluid pressure brake, the combination with a train pipe, a valve mechanism operating in response to variations in pressure in an application chamber for supplying air to apply the brakes and provided with a flanged section having gasket faces on opposite sides, and an automatic valve device subject to the opposing pressures of the train pipe and a pressure chamber, for controlling the pressure in the application chamber and secured to one gasket face, of a casing secured to the other gasket face and containing the pressure chamber and the application chamber.

40. In a fluid pressure brake, the combination with a train pipe, an application chamber separated from the train pipe, and a valve device operated by variations in pressure in the application chamber for controlling the supply of fluid to one brake cylinder area in a service application of the brakes, of means operating upon an emergency application of the brakes to supply fluid to a larger brake cylinder area.

41. In a fluid pressure brake, the combination of a train pipe, a service brake cylinder, an extra brake cylinder, a reservoir on a car, and means actuated by a reduction in train pipe pressure after equalization of the service brake cylinder with the reservoir on the car and arranged to establish connection between a source of pressure and the extra brake cylinder.

42. In a fluid pressure brake, the combination of a train pipe, a pair of brake cylinders, a reservoir on a car, and means operative by reductions in train pipe pressure and arranged on service reduction of train pipe pressure to connect the reservoir on a car with one of said brake cylinders and upon reduction of train pipe pressure after full service application to establish connection between a source of pressure and the other brake cylinder.

43. In a fluid pressure brake, the combination of a train pipe, a pair of brake cylinders, a reservoir on a car, means operative by reductions in train pipe pressure and arranged upon service reduction of train pipe pressure to connect the reservoir on a car with one of said brake cylinders and upon reduction of train pipe pressure after full service application to establish connection between a source of pressure and the other brake cylinder, and supplementary means controlled by said main means and arranged to maintain brake cylinder pressure against leakage.

44. In a fluid pressure brake, the combination of a train pipe, a pair of brake cylinders, a reservoir on a car, a valve mechanism operative by variations in train pipe pressure and arranged upon service reduction in train pipe pressure to cause the admission of pressure from said reservoir to one of said braking cylinders and upon further reduction in train pipe pressure after full service application to establish connection between a source of pressure and the other brake cylinder.

45. In a fluid pressure brake, the combination of a train pipe, a pair of brake cylinders, a reservoir on a car, valve mechanism operative by variations in train pipe pressure and arranged upon service reduction of train pipe pressure to cause the admission of pressure from said reservoir to one of said brake cylinders and upon further reduction of train pipe pressure after full service application to establish connection between a source of pressure and the other brake cylinder, and a supplementary valve device actuated from the primary valve device and arranged to maintain the brake cylinder pressure against leakage.

In testimony whereof I have hereunto set my hand.

WALTER V. TURNER.

Witnesses:
Wm. M. Cady,
A. M. Clements.